United States Patent [19]

Dorner et al.

[11] 4,038,134
[45] July 26, 1977

[54] PRESSURIZED WATER-COOLED REACTOR SYSTEM

[75] Inventors: Heinrich Dorner, Erlangen; Elmar Harand, Hochstadt; Walter Kleiter, Erlangen, all of Germany

[73] Assignee: Siemens Aktiengesellschaft, Munich, Germany

[21] Appl. No.: 644,914

[22] Filed: Dec. 29, 1975

Related U.S. Application Data

[63] Continuation-in-part of Ser. No. 393,287, Aug. 31, 1973, abandoned.

[51] Int. Cl.² ............................................. G21C 19/28
[52] U.S. Cl. .................................... 176/65; 176/87; 165/107
[58] Field of Search .................. 176/65, 87; 122/32; 165/107

[56] References Cited

U.S. PATENT DOCUMENTS

| | | | |
|---|---|---|---|
| 3,287,226 | 11/1966 | Webb | 176/65 |
| 3,357,892 | 12/1967 | Schmidt | 176/65 |
| 3,395,076 | 7/1968 | Ruppen, Jr. | 176/65 |
| 3,437,559 | 4/1969 | Junkermann et al. | 176/87 |
| 3,651,866 | 3/1972 | Leleg et al. | 176/65 X |
| 3,793,143 | 2/1974 | Muller | 176/87 X |
| 3,883,392 | 5/1975 | Burylo et al. | 176/87 X |
| 3,929,188 | 12/1975 | Brinkmann et al. | 176/60 X |

FOREIGN PATENT DOCUMENTS

| | | | |
|---|---|---|---|
| 809,796 | 3/1959 | United Kingdom | 176/65 |
| 1,067,081 | 3/1967 | United Kingdom | 176/65 |
| 763,231 | 12/1956 | United Kingdom | 176/65 |

*Primary Examiner*—Peter A. Nelson
*Attorney, Agent, or Firm*—Kenyon & Kenyon, Reilly, Carr & Chapin

[57] ABSTRACT

An improved pressurized water-cooled reactor system which includes a reactor core pressure vessel; coolant lines coupled to the pressure vessel; vertically arranged steam generators having the housings thereof coupled to the coolant lines; and coolant pumps associated with the steam generators and coupled to the coolant lines. Each of the pumps has a vertically arranged impeller portion driven by an electric motor for circulating coolant between the pressure vessel and tube sheet type heat exchangers in the steam generators, at least the impeller portion of each pump being disposed within a chamber associated with each steam generator which is communicative with the coolant lines. The vessel, the coolant lines and the steam generators including the impeller chamber are each individually encapsulated by ruptureproof safety housings (encasements) forming a protection system for the primary loop components.

2 Claims, 3 Drawing Figures

PRESSURIZED WATER-COOLED REACTOR SYSTEM

This application is a continuation-in-part of applicants' prior copending application Ser. No. 393,287, filed Aug. 31, 1973 and assigned to the same assignee and now abandoned.

FIELD OF THE INVENTION

The invention relates generally to nuclear reactors, and in particular, to an improved pressurized water-cooled reactor system.

DESCRIPTION OF THE PRIOR ART

Pressurized water-cooled reactor systems are known at present and are generally configured so that the steam generators and coolant pumps thereof are separated from the reactor core pressure vessel and the safety houding enclosing the pressure vessel, and may include a steam pressure relief mechanism. See, for example, German Offenlegungsschrift No. 20 20 046, which discloses a condensation chamber containing ice which iscoupled to the reactor core pressure vessel to effect condensation of steam escaping from the reactor system to reduce the steam pressure exerted on the safety housing enclosing the pressure vessel. Such reactor systems generally have coolant line design features which are unduly complex, and it has been proposed to combine structural components of such reactor systems in order to both reduce reactor fabrication costs and simplify the coolant line design. Specifically, the steam generators of gas-cooled reactor system have been structurally combined with reactor core pressure vessels. The fabrication costs of reactor systems using such a design, however, have not been significantly reduced since the cost of fabricating the reactor pressure vessel itself has increased.

SUMMARY OF THE INVENTION

It is therefore a general object of the invention to provide an improved pressurized water-cooled reactor system having a rupture-proof protection system for the primary loop components which is less expensive to fabricate than heretofore known reactor systems and which includes simplified coolant line design features. It is a more particular object of this invention to provide an arrangement of and a rupture-roof protection system for the primary components, i.e. pressure reactor vessel, steam generators, the connecting pipes and at least the main coolant pump impeller, which avoids bulkiness and warrants accessibility for periodical inspections to the steel walls of the primary components.

Still another object of the invention is to improve the conditions for the personal working close to the primary components, i.e. provide for an improved biological and thermal shield of the primary components.

Still another object of the invention is to protect the containment more efficiently, in the event that a loss of primary coolant accident might occur, by limiting the size of the potential cracks and by restricting internal parts, having a tendency to fly outwardly, within rupture-roof encasings.

To accomplish the above cited objects, the invention comprises essentially the concept of a pressurized-water reactor pressure vessel positioned in the usual pit formed by concrete surrounding the vessel. The reactor's steam generators are vertically positioned adjacent to the pit and connected directly with the reactor pressure vessel by single straight pipes internally constructed to provide the two flow paths required to circulate the pressurized-water coolant through the pressure vessel and the steam generators. According to the invention the steam generators, the reactor pressure vessel and the pipes, hereinafter referred to as primary components, are each individually provided with rupture-proof protection means which comprises reinforced concrete encasements directly and individually enclosing each of said primary components, in each instance. With this rupture-proof protection encasing each primary component additional safety is obtained, because in case of a crack in the components's housing — though the probality of such an event is very low — the rupture-roof encasing prevents growing of the cracks, and the gap of the crack remains very small. Further no parts can "explode" through the encasing. The above construction introduces the problem of where to put the main coolant pumps required to circulate the coolant loop formed by the two (or more) flow paths of each pipe and the steam generator, in each instance. According to the present invention, this is solved by positioning the pump impellers inside the bottoms of each of the steam generators, with the motors on the outside of the rupture-proof encasement, in each instance. Within the aforementioned PWR primary loops in case of a crack or rupture of a pipe or the steel compartment of the impeller (loss of primary coolant accident) a pressure drop on either the upstream or the downstream-side might occur, so that the pump impeller comes into overspeed thus being submitted to increased centrifugal forces. However, due to the fact that the pipes as well as the compartment for the impeller are enclosed by rupture-proof encasings, the crack remains small in size, thus limiting the escape of coolant and limiting the pressure drop, so that the acceleration momentum with regard to the drive shaft and the impeller can be limited and a stop mechanism for the flywheel, normally coupled to the shaft, can be actuated. Simultaneously an emergency cooling system for the core can be put into operation to take over the core cooling. Similarly, the rupture-proof encasings protect the steam generator and the primary loop cooling function in case of a loss of secondary coolant accident (crack of the pipes or the steam generator within the secondary loop system). Thus the invention solves the problem to cope with rupture-proof housings and pipes and simultaneously avoiding bulky, voluminous piping and housings for the primary loop of a PWR. Further, the construction appears to be designed to provide positive protection against the impeller shaft, and the impeller also in the event that parts thereof might get loose.

DETAILED DESCRIPTION

Figure 1:
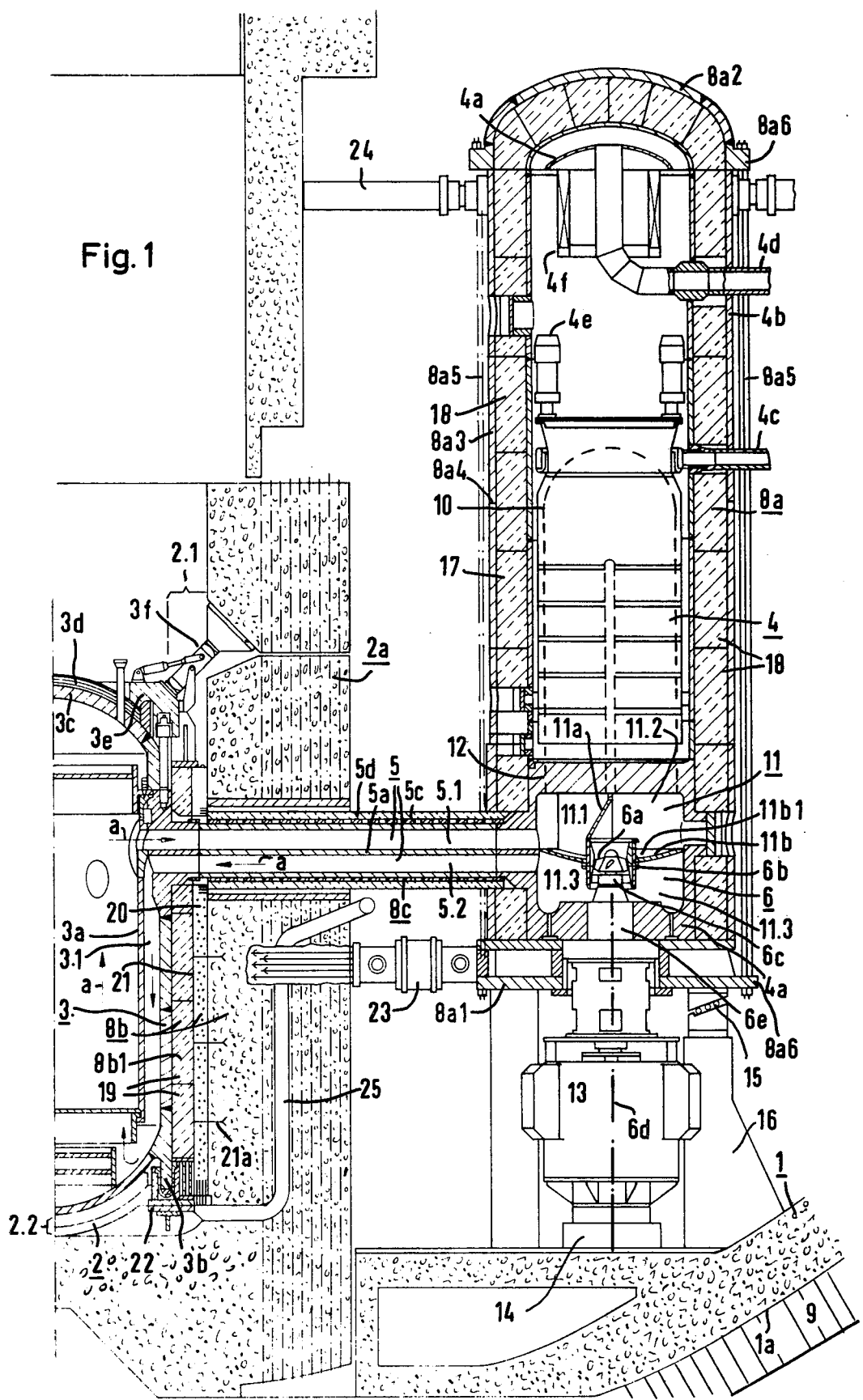
FIG. 1 is a cross-sectional view of an improved pressurized water-cooled reactor system contructed according to the invention, showing only one half portion of the entire system, it being understood that the other half is of corresponding shape and construction.
Figure 2:
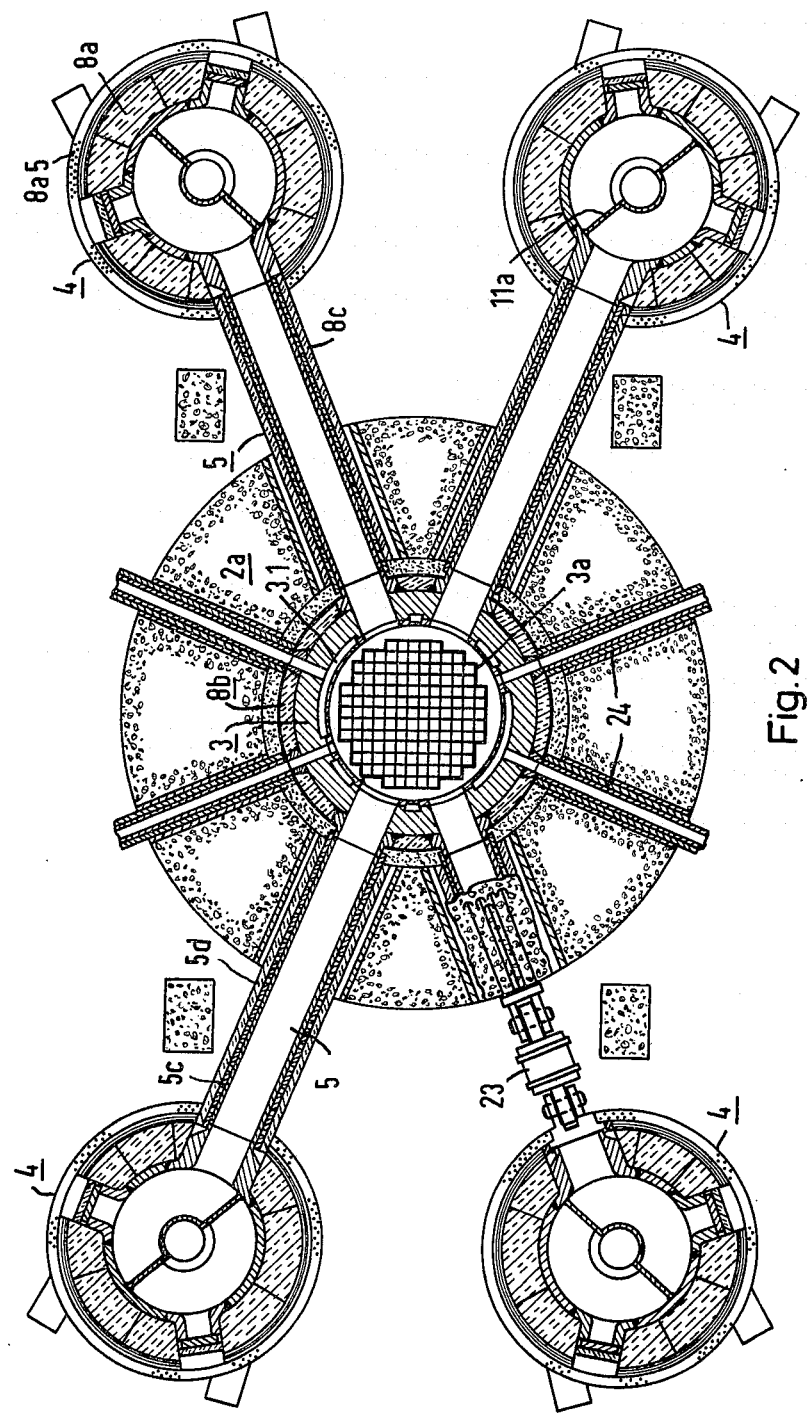
FIG. 2 is a top sectional view of the reactor system, taken along section 2—2 of FIG. 1, except for a hydraulic shock damping means shown left below in FIG. 2 instead of a pipe, wherein not only the right hand but also the left hand positions of the installation are shown.

Referring now to the drawings, specifically FIGS. 1 and 2, there is shown an improved pressurized water-cooled reactor systems constructed according to the invention comprising a cylindrical-shaped concrete housing structure 1 encompassed by a steel shell 1a and having a nuclear reactor pit 2 containing a reactor core pressure vessel. The pit 2 is formed, as known in the art, by a generally cylindrical shaped construction 2a of prestressed concrete serving as a support and a biological shield for the pressure vessel 3. The annular gap 2.1 and the axial gap 2.2 between the construction 2a and the vessel 3 form a space for positioning the rupture-proof encasement 8b and for cooling purposes, as described hereinafter. The construction 2a in turn is supported by the structure 1. A plurality of steam generators 4 (four are illustrated in the accompanying drawings) are disposed about pressure vessel in 3 in oppositely disposed pairs. A plurality of coolant lines 5 are coupled to pressure vessel 3 and steam generators 4 and circulate pressurized water between the steam generators and pressure vessel. Coolant pumps 6 each having an impeller portion 6a and a driving means illustrated as motors 13, are coupled to the coolant lines. As illustrated in the drawings, at least the impeller portions 6a of pumps 6 are disposed within a chamber 11 formed by the housings of steam generators 4. Rupture-proof exterior safety housings 8a, 8b and 8c encapsulate steam generators 4 pressure vessel 3 and the coolant lines 5, respectively. The spherical-shaped containment safety housing 1a completely surrounds the nuclear reactor installation; on the outside thereof there is located the base or foundation 9. FIG. 1 illustrates one steam generator 4 and one coolant pump of the reactor system. The housing of the steam generator 4 includes a tube sheet type heat exchanger including a bank of curved, U-shaped tubes lo (not illustrated in detail). Both ends of tubes lo open into a spaces 11.1 and 11.2, respectively, in the chamber 11 of the steam generator housing beneath the tube sheet 12 for circulating the pressurized water therethrough, 11.1 being the inlet chamber and 11.2 being the outlet chamber of the steam generator 4. Both chambers 11.1 and 11.2 are separated from each other by an inclined and slightly curved portion wall 11a, and both chambers are separated from the lower pressure chamber 11.3 of the pump 6 by a substantially horizontal and curved wall 11b with the exception that the wall portion belonging to the outlet chamber 11.2 has a through-opening 11b1 for insertion of the pump housing 6b and the impeller 6a of pump 6, so that outlet chamber simultaneously is the suction chamber (upstream side) of the pump 6. Impeller 6a of the pump 6 is mounted on a drive shaft (not shown but indicated by the axis 6d of rotation) journaled within a mounting housing 6e, the latter supporting the annulus of stationary guiding vanes 6c on its top and containing the bearings, the sealings and the coupling for the drive shaft (not shown). The mounting housing 6e has a cylindrical intermediate portion fitting snugly within a central opening of the bottom plate 4a of steam generator 4 and has a lantern-like shaped portion with a flange which abuts the lower side of the bottom plate 4a and is screwed thereto. The lanternlike shaped portion is connected to the housing of the electric motor which, therefore, is suspended via the mounting housing 6e through the bottom plate 4a of the steam generator 4, the latter together with pump 6 and motor 13 being supported via bearing 15 on the base structures 16. Adjustable lifting means 14 below 13 serves as mounting aid. The drive shaft of the motor 13 (also not shown, but indicated by the center axis 6d) is aligned with respect to the pump drive shaft and is drivingly connected to the latter, it being understood that the housing of the motor 13, the mounting housing 6e and the pump housing proper 6b are aligned with regard to the axis of rotation 6d. The vertical reactor pressure vessel 3 supports a core barrel 3a containing and supporting the reactor core (not shown) and forming an inlet channel 3.1 between the vessel 3 and the barrel 3a. The coolant line 5 is formed by a duplex type pipe having an upper duct 5.1 and a lower duct 5.2 separated from each other by a horizontal partition wall 5a. The latter is welded on its left end to the core barrel 3a and on its right end to the curved wall 11b. As indicated by arrows a, the primary coolant (light water) is circulated by the pump 6 from suction chamber 11.2 downwardly into pressure chamber 11.3 through lower duct 5.2, from here into the annular inlet channel 3.1 downwardly into the reactor core where the water is flowing upwardly and is heated, thereby dissipating the heat of the fuel elements (not shown). From the core cooling channels the water is discharged into the upper duct 5.1 where it flows horizontally to the inlet chamber 11.1 of the steam generator 4 and from there as heating fluid through the tubes lo back to the outlet chamber 11.2 and so forth. The steam generator 4 has an outer wall 4b, a feedwater inlet pipe 4c and a life steam line 4d. Moisture separators are designated 4e and a steam dryer 4f. The dry steam flows through a screen 4a and after a deflection of about 180° into the life steam line. The steam generator 4 is encompassed, as mentioned, by the rupture-proof encasement 8a, comprising a lower cover 8a1, an upper cover 8a2 and tension-proof annular elements 8a3, the latter being arranged axially aligned one adjacent the other, i.e. stacked and welded together at the seams 8a4. The so formed outer shell 8a1, 8a2, 8a3, 8a4 is secured by axially oriented tension cables or anchors 8a5 clamped with their ends to respective flanges 8a6 and distributed over the circumference of the steam generator 4. These anchors may be slack during inoperative condition and tensioned when the steam generator thermally expands during operation. Between the outer shell and the wall 4b of the steam generator 4 remains a space 17 filled up with segments 18, made of thermally insulating, fire-proof concrete, preferably consisting of Leca-Beton, thus being a light concrete which can easily be stacked and removed for inspection and which is strong enough to withstand compressive forces. The outer shell thus is strong enough to withstand any forces in axial or radial direction in case the wall 4b might crack, thus limiting the escape of any medium and holding parts in place.

Basically, the same principle is applied to the rupture-proof arrangement 8b of the reactor vessel 3. The intermediate space 8b1 formed by gaps 2.1 and 2.2 is — adjacent the vessel 3 — axially filled up by segments 19 consisting preferably of the same material as segments 18. The space intermediate the segments 19 and the biological shield 2a is filled with a mass of ceramic pebbles 2o, which are condensed during the filling procedure. The pebble-layer 2o is separated from the segmentlayer 19 by a liner 21, the latter being held in place by anchor elements 21a secured to the biological shield- 2a. The vessel 3 is suspended via a bottom flange 3b and leaf spring elements (not shown) within an annular base 22. On top of the vessel 3 there is, besides of the conventional lid 3c secured to the vessel 3 by studs and nuts, an additional cover 3d and catch ring 3e, the latter being secured by a hydraulic hinged support 3f, a plurality of the latter being positioned about the circumference of the vessel and being supported by the biological shield 2a.

The coolant line 5 over its length is encompassed by steel rings 5c (also serving as rupture-proof protection), and the row of steel rings is surrounded by tube-shaped body 5d consisting of thermally insulating material, e.g. Leca-Beton. The hydraulic shock-damper 23 connecting the biological shield 2a and the lower cover 8a1 allows for slowly relative movement caused by thermal expansion, but damps oscillations. The upper support 24 supports the steam generator 4 laterally to avoid tilting of the latter.

In FIG. 2 the same parts bear the same reference numerals. The lines 24 serve for emergency cooling purposes and are not descibed in detail because not relevant for the present invention. However, it has to be mentioned that line 25 in FIG. 1 is a coolant line provided to press coolant air through the pebble-layer 20 and thus cooling indirectly the outher surface of vessel 3.

From the above it can be seen that the invention provides for a reliable rupture-proof protection system encompassing and protecting the primary loop components of the PWR reactor installation without restricting accessibility and avoiding bulky constructions.

Figure 3:
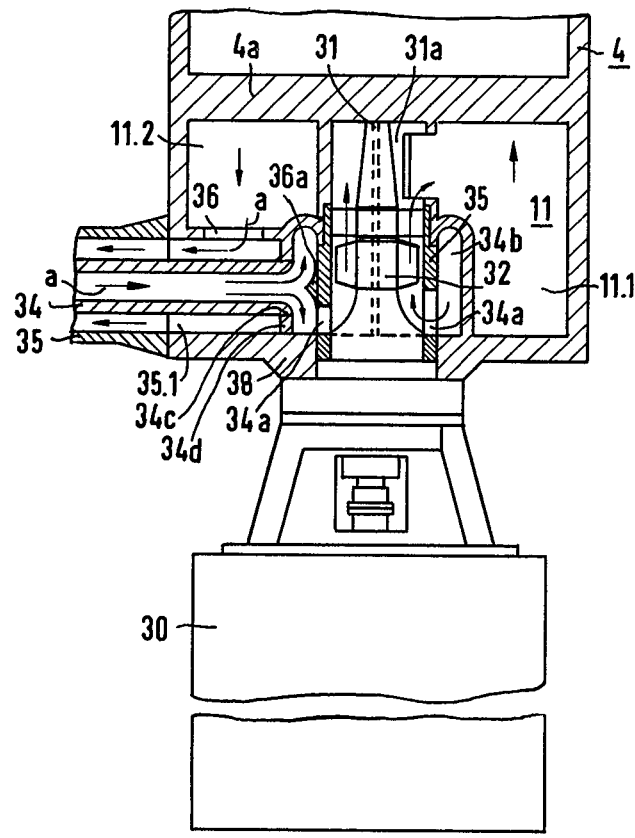
FIG. 3 is a partial, cross-sectional view of another embodiment of an improved pressurized water-cooled reactor system constructed according to the invention, showing an alternate disposition of the coolant pump and the coolant pipes with respect to a steam generator.

FIG. 3 illustrates another embodiment of the inventive water-cooled reactor system, in which the shaft of the coolant pump is disposed axially with respect to the vertical axis of the steam generator, and perpendicular to the coolant input pipe. This design has the same advantage as the embodiment according to FIGS. 1 and 2 that the radial dimensions of the reactor system can be substantially reduced. Similar to the previously described embodiment of the invention, a motor 30 drives an impeller 32 which is mounted on a cylindrical shaft. The impeller pumps the coolant from the reactor pressure vessel through an inlet pipe 34, an annular space 34b and apertures 34a provided ina sealing housing 35 into inlet chamber 11.1 of space 11 of steam generator 4. Partition wall 31 is connected to annular reinforcement wall 31a and divides space 11 into the inlet and outlet chambers 11.1, and 11.2, respectively. The coolant is further circulated through the tubes of tubular heat exchanger 4 and discharged into outlet chamber 11.2. An outer return pipe 35 is arranged concentrically around inner pipe 34 so that an annular duct 35.1 is formed and is coupled to outlet chamber 11.2 so that the latter directs the coolant flow via opening 36 back to the reactor pressure vessel (see arrows a). The inlet pipe 34 fits into a opening 34c of an annular wall 34d so that the coolant is deflected circumferentially and enters the suction side of pump impeller 32 through openings 34a of the annular space 34b. Guiding vanes 36 serve as deflectors. The sealing housing engages and is supported by the annular reinforcement wall in space 11. Flange 38, which surrounds the steam generator opening, also supports the sealing housing.

While there have been disclosed herein what are considered at present to be the preferred embodiments of the invention, it will be undersood by those persons skilled in the art that many changes and modifications may be made thereunto without departing from the invention. It is therefore intended in the appended claims to include all such changes and modifications as fall within the true spirit and scope of the invention.

What is claimed is:

1. A pressurized-water nuclear reactor installation comprising components including a vertical reactor pressure vessel, at least one vertical steam generator positioned adjacent to said vessel, and a coolant line interconnecting and extending substantially straight between said vessel and said generator, said line comprising coolant return and forwarding pipe portions forming with said generator a pressurized-water coolant circuit for said vessel, said generator containing a horizontal heat exchanger tube plate and forming a space below said plate and said space forming a part of said circuit, said space containing a coolant rotary pump impeller, the drive shaft of which is arranged vertically, all of said components being separately encapsulated by rupture-proof safety housings, a rotary drive motor for said impeller positioned on the outside of all of said housings, said drive shaft of said impeller connecting said motor with said impeller and extending through the one of said housings in which said generator is encapsulated, the one of said housings in which said vessel is encapsulated forming an annular space around said vessel and the others of said housings in each instance tightly encapsulating the component encapsulated thereby, said space below said plate comprising steam generator inlet and outlet chambers and a pressure chamber for the pump, a first substantially vertical, partition wall between said inlet and said outlet chamber, a second substantially horizontal partition wall between said inlet and said pressure chamber and a third substantially horizontal partition wall containing the pump housing with the impeller rotatably positioned within said housing between said outlet and said pressure chamber, said pump housing forming a fluid passage for the coolant from said outlet to said pressure chamber, a coolant forwarding pipe portion communicating at its one end with said pressure chamber and at its other end with a coolant inlet channel of said vessel, a coolant return pipe portion communicating at its one end with said inlet chamber and at its other end with a coolant outlet channel of said vessel, and an U-shaped tube type steam generator with its tube bundle's inlet end communicating with said inlet chamber and its tube bundle's outlet end communicating with said outlet chamber.

2. A pressurized-water nuclear reactor installation comprising components including a vertical reactor pressure vessel, at least one vertical steam generator positioned adjacent to said vessel, and a coolant line interconnecting and extending substantially straight between said vessel and said generator, said line comprising coolant return and forwarding pipe portions forming with said generator a pressurized-water coolant circuit for said vessel, said generator containing a horizontal heat exchanger tube plate and forming a space below said plate and said space forming a part of said circuit, said space containing a coolant rotary pump impeller, the drive shaft of which is arranged vertically, all of said components being separately encapsulated by rupture-proof safety housings, a rotary drive motor for said impeller positioned on the outside of all of said housings, said drive shaft of said impeller connecting said motor with said impeller and extending through the one of said housings in which said generator is encapsulated, the one of said housings in which said vessel is encapsulated forming an annular space around said vessel and the others of said housings in each instance tightly encapsulating the component encapsulated thereby, said space below said plate comprising a steam generator outlet chamber, a steam generator inlet chamber, serving as a pressure chamber for the pump, and a suction chamber for the pump, first partition wall means between said inlet and said outlet chamber, said partition wall means between said outlet and said suction chamber and third partition wall means containing the pump housing with the impeller rotatably positioned within said housing between said suction chamber and said inlet chamber, a coolant forwarding pipe portion communicating at its one end with said suction chamber and its other end with a coolant outlet channel of said vessel, a coolant return pipe portion communicating at its one end with said outlet chamber and at its other end with a coolant inlet channel of said vessel, and an U-shaped tube type steam generator with its tube bundle's inlet end communicating with said inlet chamber and with its tube bundle's outlet end communicating with said outlet chamber.

* * * * *